No. 614,606. Patented Nov. 22, 1898.
D. BLACK.
MACHINE FOR MOLDING BRICKS, TILES, &c.
(Application filed Dec. 2, 1897.)
(No Model.) 4 Sheets—Sheet 1.

Witnesses:
Inventor:
David Black
By his Attorneys.

No. 614,606. Patented Nov. 22, 1898.
D. BLACK.
MACHINE FOR MOLDING BRICKS, TILES, &c.
(Application filed Dec. 2, 1897.)
(No Model.) 4 Sheets—Sheet 2.

Witnesses: Inventor:
E. B. Bolton David Black
By Richardson
his Attorneys

No. 614,606. Patented Nov. 22, 1898.
D. BLACK.
MACHINE FOR MOLDING BRICKS, TILES, &c.
(Application filed Dec. 2, 1897.)
(No Model.) 4 Sheets—Sheet 3.
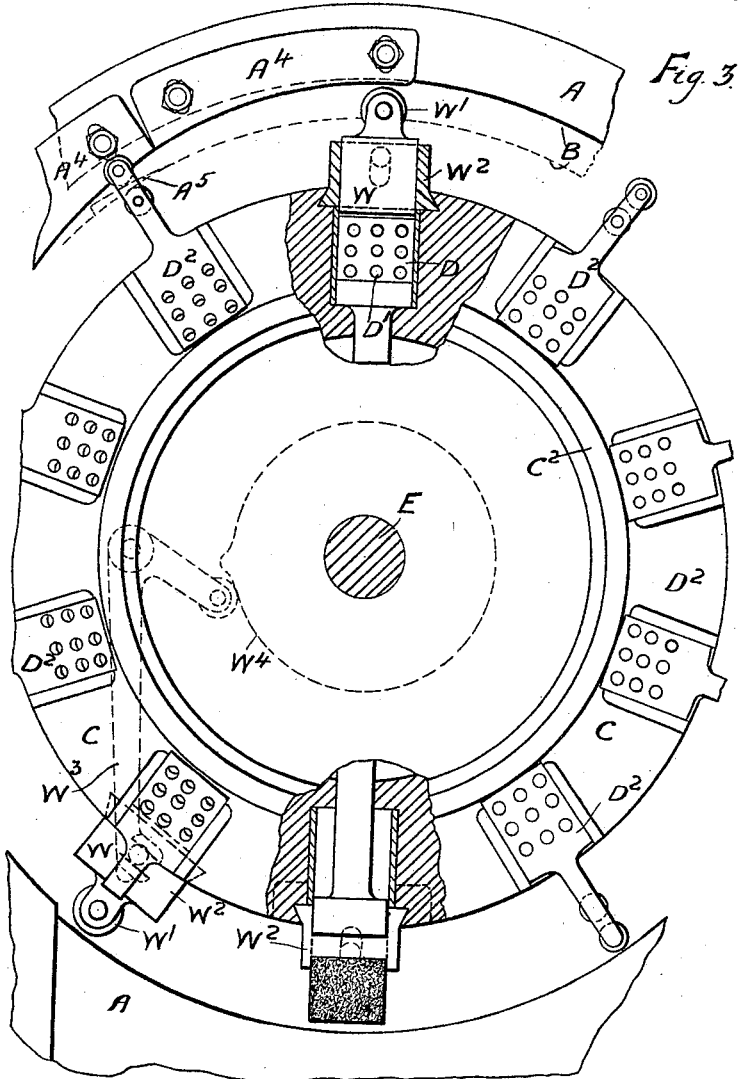
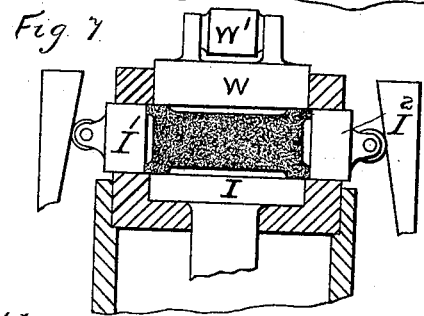
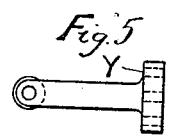
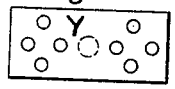
Witnesses:
Inventor:
David Black
By
his Attorneys

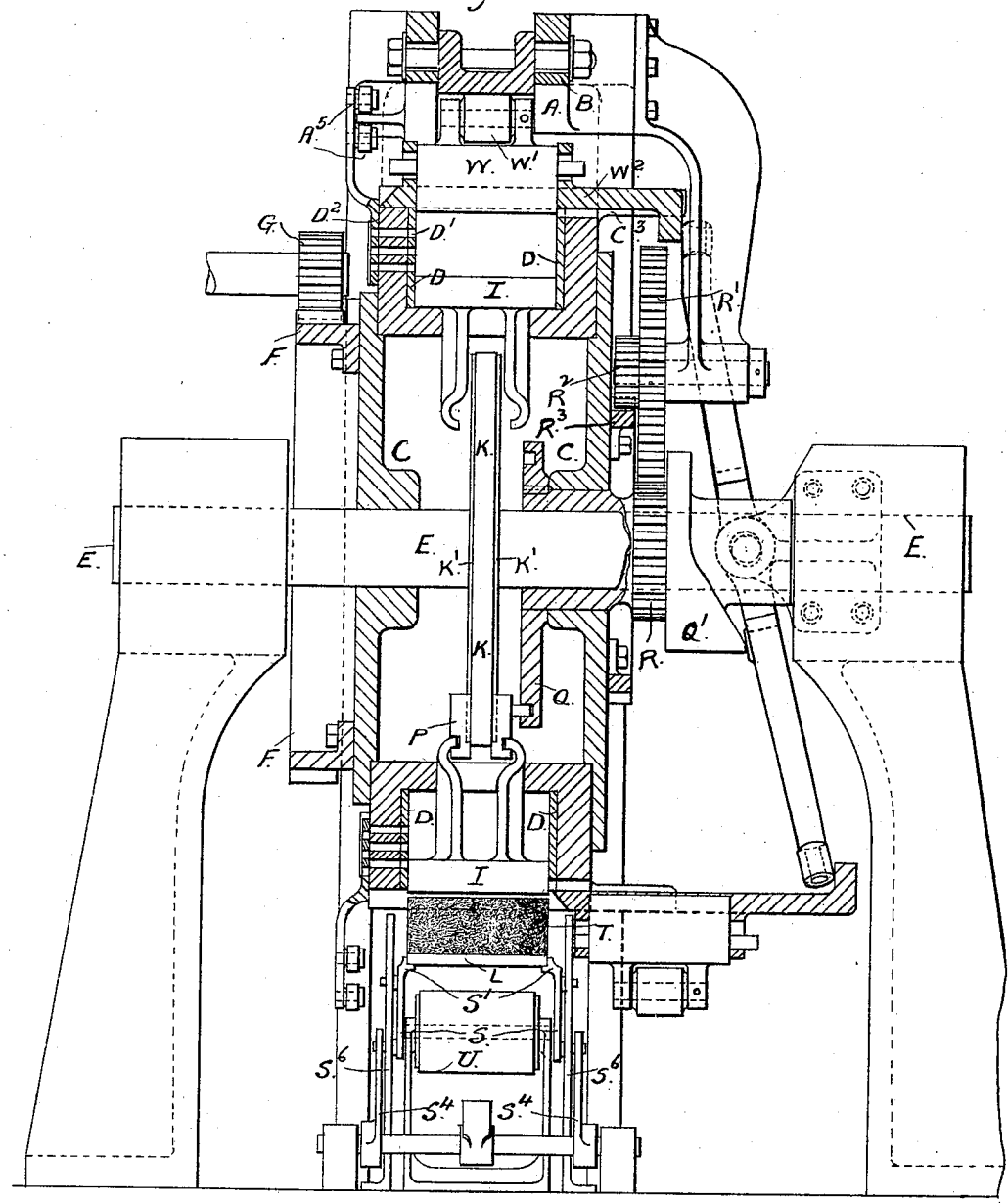

UNITED STATES PATENT OFFICE.

DAVID BLACK, OF SHETTLESTON, SCOTLAND.

MACHINE FOR MOLDING BRICKS, TILES, &c.

SPECIFICATION forming part of Letters Patent No. 614,606, dated November 22, 1898.

Application filed December 2, 1897. Serial No. 660,499. (No model.)

*To all whom it may concern:*

Be it known that I, DAVID BLACK, engineer, of 12 Huntly Terrace, Shettleston, in the county of Lanark, Scotland, have invented certain new and useful Improvements in Machines for Molding Bricks, Tiles, and the Like, of which the following is a specification.

This invention relates to machines for molding bricks, tiles, and the like; and it has for its objects, first, to simplify the working parts of such machines, and thereby minimize friction; second, to improve the construction so as to increase the output or reduce the power necessary to drive such machines, and, third, to deliver the brick, tile, or other article in the exact form imparted to it by the mold without the disadvantage hitherto experienced of damaging the edges or other parts.

The invention is illustrated by the accompanying drawings.

Figure 1:
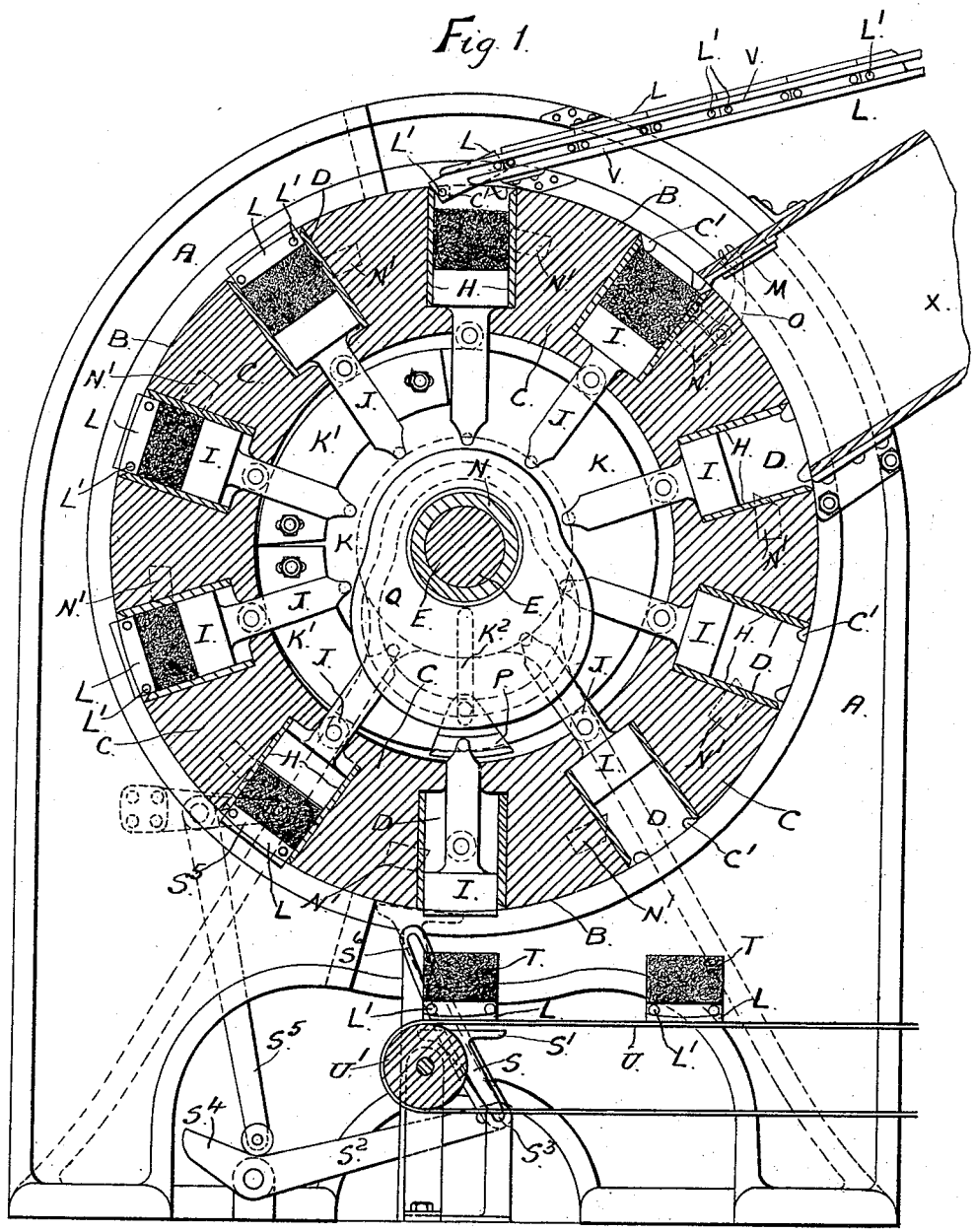
Figure 2:
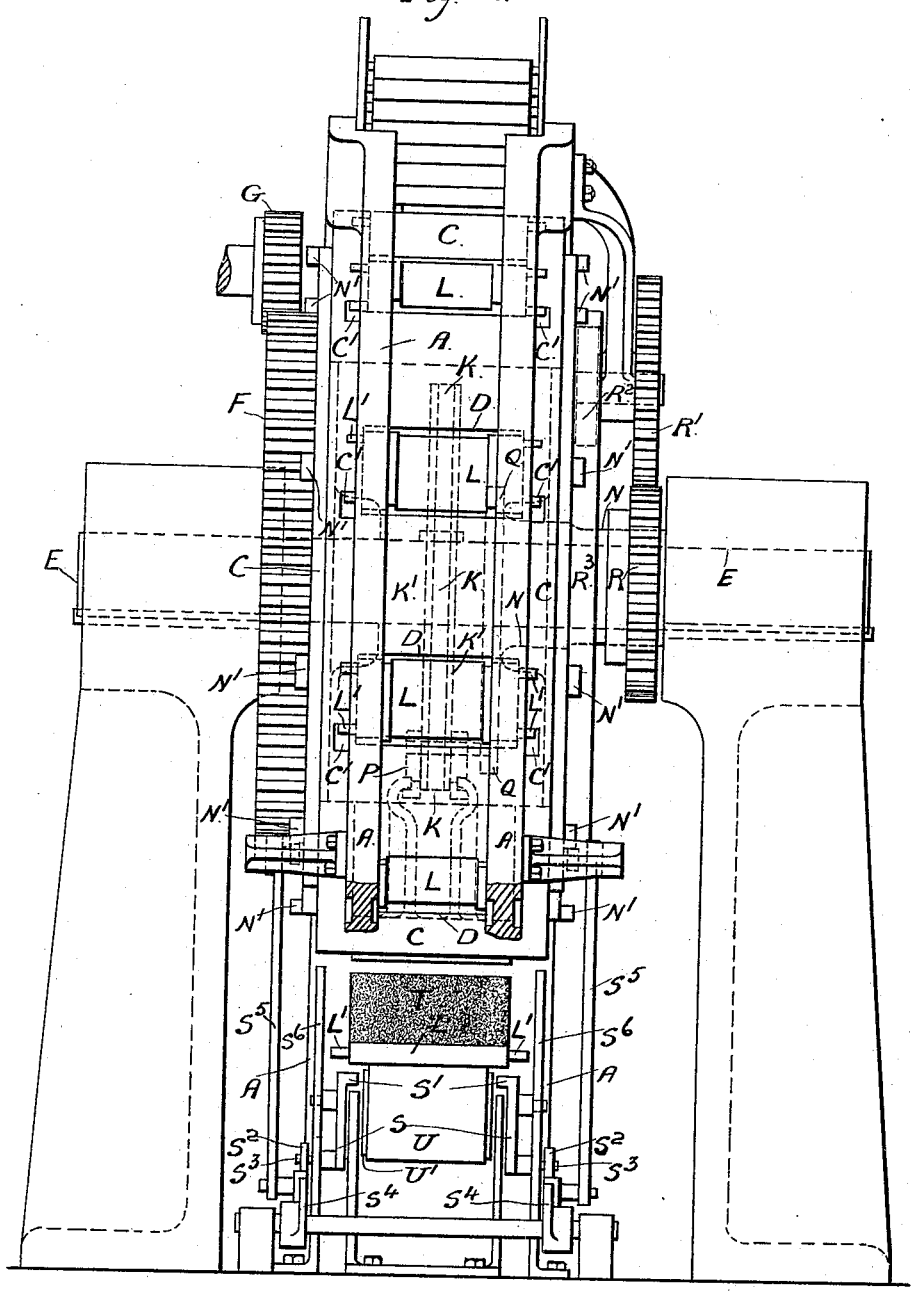

Figure 1 is a vertical transverse section, and Fig. 2 an end elevation, of the improved machine. Figs. 3 and 4 are part longitudinal section and part transverse section of a modified form of machine. Figs. 5 and 6 are side and front elevations, respectively, of a modified form of feeding-plunger. Fig. 7 is a part longitudinal vertical section of a machine in which the pressure is applied on three sides simultaneously.

Referring particularly to Figs. 1 and 2, the improved apparatus comprises one or more upright stationary casings A, one only being shown on the drawings, each having a central orifice B, within which is situated a wheel C, or wheels having a series of molds or pockets D, extending radially inward from the periphery, said wheel or wheels revolving clear of the inner surface of the orifice B in the casing A upon a horizontal stationary shaft or axle E. The mold-wheel C or wheels is or are driven by spur or other gearing F G, the spur-wheel F being secured upon the face of said mold wheel or wheels, and the molds or pockets D are preferably lined with plates H, capable of being withdrawn in order that others may be substituted to suit the size and form of brick or other article to be molded. The inner end of each of the molds or pockets D consists of a movable bottom or plunger I, having on its outer side a roller J, which is acted upon to mold the clay during the rotation of the mold-wheel C by a stationary cam K, secured upon the fixed shaft. This cam K is preferably so formed as to impart to the plungers, first, no movement during the time the molds are being filled; second, a movement for a predetermined time corresponding to the initial pressure desired; third, an additional pressure, if desired; fourth, a dwell during which the pressure is constant, thus allowing the brick, tile, or other article time to set, and, fifth, to release the pressure previous to the expulsion of the molded article, the cam being preferably constructed of several pieces K', adjustable in relation to each other. These movable bottoms or plungers I press the clay against pallet or delivering boards L, which form temporary covers for the molds D and which are fed one into each mold after the mold has received its charge of clay from the hopper X, the backs of the pallet-boards L bearing against the surface of the orifice B in the casing A, which orifice forms a race for the boards L. The inner surface of each plunger I and, if desired, the corresponding surface of each pallet-board L may be provided with a projecting portion to form the "frog" in the case of a brick, or any ornamental design in relief or intaglio in the case of an ornamental tile or other article having an ornamental face or faces. After each mold D has received its charge of clay and before the delivering-boards L are fed into the mold a scraper or "doctor" M is passed over the top of the mold in order to roughly level it. This scraper preferably consists of a thin sheet of metal corresponding to the breadth of the mold D, and it is lowered into and raised out of the mold D at the proper times by the action of projections N', formed on the wheel-face on a bell-crank lever O, engaging the scraper M. On the rotation of the mold-wheel C the molds D are brought in succession to the ejecting-point, where the outer sides of the movable bottoms or plungers I are acted upon by an ejecting-piece P, which slides in a slot $K^2$ in the stationary cam K and receives its motion from a rotating cam Q on the sleeve N, before mentioned, the ejecting-piece P being provided with a pin which enters and is acted upon by a cam-groove in the face of the cam Q, as shown in Fig. 4, the sleeve N being geared by a toothed wheel R to gearing R' R² R³, the latter gear being secured on the face of the mold-wheel C. At the ejecting-point a frame S, having receiving-arms S', is provided, onto which the pallet or delivering board L is brought, and this frame S at the proper time is caused to travel downward and forward to correspond to the combined motions of the rotating wheel C and of the ejected brick T. This motion is communicated to the frame S by a lever S², which engages studs S³ on the frame, a tail S⁴ on the lever S² being acted upon by a bell-crank lever S⁵, one end of which is acted upon by the projections N' on the mold-wheel face C. The receiving-arms S' are of sufficient breadth to pass outside of an endless band U on a roller U', and are arranged to pass below the line of travel of said band, as shown, which band conveys the brick T, together with its pallet-board L, to any desired point. The pallet-boards L are then removed and conveyed by mechanical or other means to the hopper for receiving them, which is situated over the mold-wheel radially in line with the center of rotation or to a race V, as shown. These boards may fall by gravity, one at a time, into the pockets of the mold-wheel, but a feeding device is preferably provided for this purpose on the side of the hopper. The pallet-boards may have pins L' on their sides, the lower of which fall into notches C' on the periphery of the mold-wheel C, the boards being carried around by the action of the notches upon the pins L' of the pallet-board L.

To allow for the expression from the molds or pockets of any surplus clay, the face or faces of the wheel or wheels are preferably formed with a series of perforations D', as shown at Figs. 3 and 4, and which may be used on the machine illustrated by Figs. 1 and 2, these perforations being opposite and communicating with the interior of each mold or pocket D, and these perforations D' may be further covered on the outside by perforated plates D², to which motion is given by inclined portions A⁵ on the casing, (shown in dotted lines in Fig. 3 and in full lines in Fig. 4,) to close more or less, as desired, the outlet-orifices D' for the expressed clay. The mold-wheel C is provided with a light annular gutter C² to catch and lead the expressed clay clear of the machine.

In a modification of the improved machine and as illustrated by Figs. 3 and 4 the outer end of each of the molds or pockets D may be fitted with a plunger W, provided on its outer face with rollers W', which on the rotation of the mold-wheel C are acted upon by the inner surface of the orifice B in the casing A in order to press the brick, tile, or other article to the desired form and size. The inner surface of the orifice B in the casing A is in this case so formed as to impart to the plungers the movements previously described in reference to the stationary cam. The plungers W may either be carried in sliding covers W², adapted to be withdrawn into guides C³, formed on one side of the mold-wheel rim, or to be withdrawn entirely, as hereinafter described The sliding covers W² act in closing to cut the surplus clay from the outer end of the mold, and thus take the place of the scraper or doctor M, previously mentioned. The clay is pressed by these plungers W against the bottoms of the molds, which are each formed by a plate I, as before described, but having in this case no movement excepting at a particular point, where the molded article is expelled. When the brick or other article has been molded and before it is brought by the rotation of the mold-wheel C opposite the ejecting-point, the plunger is withdrawn by the action of a lever W³, actuated by a cam or eccentric W⁴, into the sliding cover W², which carries it, and which is then withdrawn transversely of the wheel-rim into the guides C³, formed for it on said wheel, by the action of a double-ended lever pivoted on a stationary part of the machine and actuated by a cam W⁵ on the outer end of the sleeve N, as shown at Fig. 4.

When no sliding cover is provided, the plunger or pallet-board may be entirely withdrawn from the mold-wheel C into a race A', formed in the casing A, around which it is carried by projections C⁴ on the mold-wheel C, as shown at Fig. 5, or by other means, until it is brought opposite its own particular mold or pocket (after the contents of said pocket has been discharged and the pocket refilled with clay) and placed into the pocket D by the action of an inclined portion A² of the race A'. When the mold or pocket D, from which the molded article is to be expelled, is brought opposite the ejecting-point, the bottom I of the mold D is acted upon by an ejecting-rod, such as already described in reference to Figs. 1 and 2, situated between the wheel-rim and its nave.

The clay is fed by gravity from the hopper X directly into the molds or pockets D or into a chamber A³, as shown at Fig. 6, in the stationary casing A, communicating with the molds or pockets, and the chamber A³ in the stationary casing may, if desired, be provided with a plunger Y, adapted to push the clay into the molds or pockets D, the plunger having, preferably, perforations in it, as shown at Figs. 7 and 8, to permit of the passage of the surplus clay. This plunger may or may not be recessed, but when recessed, as shown at Fig. 6, it would be deeper than but otherwise of similar shape to the brick or other article to be molded, the mouth of the plunger being preferably provided with knife-edges in order to cut the clay and being movable and operated by a separate cam Z from that which operates the plunger Y or by eccentrics or other means at different times.

In combination with the first-described modification the two sides of the brick, tile, or other article may receive pressure from movable plungers W I I' I², as shown by Fig. 9, these being acted upon by inclined races and released at the proper time to eject the brick.

By either of the above-described methods a plain molded article can be obtained or a molded article stamped or otherwise ornamented on one, two, three, or four of its sides, the wheel being rotated at constant speed during the feeding and pressing of the clay and the ejecting of the molded article.

Having now described the invention, what I claim, and desire to secure by Letters Patent, is—

1. A machine for molding bricks and the like, comprising a stationary casing, a horizontal stationary axle, a wheel rotating within said casing upon said axle having molds formed in its periphery, plungers forming the bottoms of said molds adapted to give the desired pressure and to eject said articles, cams on the stationary shaft adapted to operate said plungers, a plurality of independent and unconnected pallets adapted to close the mouth of the mold and be carried around between the wheel and casing, and mechanism for feeding said pallets to the molds, substantially as described.

2. In a brick-molding machine, in combination with the rotary mold-wheel having molds or pockets, of the pallets or delivery-boards, a race or hopper for delivering said pallets to the molds, mechanism for ejecting said pallets from said molds, receiving-arms adapted to receive the pallets and lower them together with the molded articles, a traveling band to receive the pallets and articles from the arms, and means for operating said arms to raise and lower the same, substantially as described.

3. In a machine for molding bricks, tiles and the like, a mold-box having one or more of its sides perforated to allow for the expression of the surplus clay and a perforated plate adapted to cover more or less the outlet for the clay substantially as described.

4. In a machine for molding bricks, tiles and the like having a stationary casing within which the mold-wheel revolves of plungers acted upon by cam-like portions on the casing sliding covers carrying said plungers and adapted to be brought over the molds and to be withdrawn into guides in the side of the mold-wheel a cam on the axle of the mold-wheel a lever actuated by said cam to slide said cover back and forth to permit of the filling of said mold and the ejection of the molded article.

5. A machine for molding bricks, tiles and the like, comprising a rotary mold-wheel having molds or pockets in its periphery plungers forming four sides of said molds, and cams for operating said plungers, substantially as described.

Signed at Glasgow, county of Lanark, Scotland, this 13th day of November, 1897.

DAVID BLACK.

Witnesses:
WALLACE FAIRWEATHER,
JNO. ARMSTRONG, Jr.